US007226213B2

(12) United States Patent
Roos et al.

(10) Patent No.: US 7,226,213 B2
(45) Date of Patent: Jun. 5, 2007

(54) MULTILAYER PLAIN BEARING

(75) Inventors: Udo Roos, Homberg/Ohm-Deckenbach (DE); Erik Kraft, Stadtallendorf (DE)

(73) Assignee: Federal-Mogul Deva GmbH, Stadtallendorf (DE)

( * ) Notice: Subject to any disclaimer, the term of this patent is extended or adjusted under 35 U.S.C. 154(b) by 0 days.

(21) Appl. No.: 10/497,937

(22) PCT Filed: Dec. 3, 2002

(86) PCT No.: PCT/EP02/13654

§ 371 (c)(1),
(2), (4) Date: Feb. 3, 2005

(87) PCT Pub. No.: WO03/048594

PCT Pub. Date: Jun. 12, 2003

(65) Prior Publication Data

US 2005/0141791 A1    Jun. 30, 2005

(30) Foreign Application Priority Data

Dec. 4, 2001    (DE)   ................................ 101 59 502

(51) Int. Cl.
*F16C 33/28*    (2006.01)
(52) U.S. Cl. ........................ 384/298; 384/300; 384/911
(58) Field of Classification Search ........ 384/297–300, 384/276, 911
See application file for complete search history.

(56) References Cited

U.S. PATENT DOCUMENTS

| 3,131,979 | A | * | 5/1964 | Shobert | 384/298 |
| 3,692,375 | A | * | 9/1972 | Matt et al. | 384/298 |
| 3,734,585 | A | | 5/1973 | Conru | |
| 4,976,550 | A | * | 12/1990 | Shobert | 384/298 |
| 5,112,901 | A | | 5/1992 | Buchert et al. | |
| 5,417,499 | A | * | 5/1995 | Jacques et al. | 384/298 |
| 5,631,085 | A | | 5/1997 | Gebauer | |

FOREIGN PATENT DOCUMENTS

| DE | 2104605 C2 | 8/1971 |
| DE | 23 41 333 A1 | 2/1975 |
| DE | 88 17 149.3 | 8/1993 |
| DE | 42 17 319 A1 | 12/1993 |
| GB | 1 362 392 | 8/1974 |
| WO | PCT/BG79/00046 | 3/1979 |

* cited by examiner

*Primary Examiner*—Thomas R. Hannon
(74) *Attorney, Agent, or Firm*—Robert L. Stearns; Dickinson Wright PLLC

(57) ABSTRACT

A multi-layer plane bearing has a bearing layer and a gliding layer connected to it. The gliding layer includes at least one thread layer treated with an epoxy resin. The thread layer is made up of a multitude of threads of at least one thread type arranged in a given pattern. Each thread includes at least one primary thread component made of spun PTFE/polyethersulfone mixed fiber yarn and at least one secondary component made of spun polyethersulfone fiber. There thread components are twisted in shaping the threads.

23 Claims, 1 Drawing Sheet

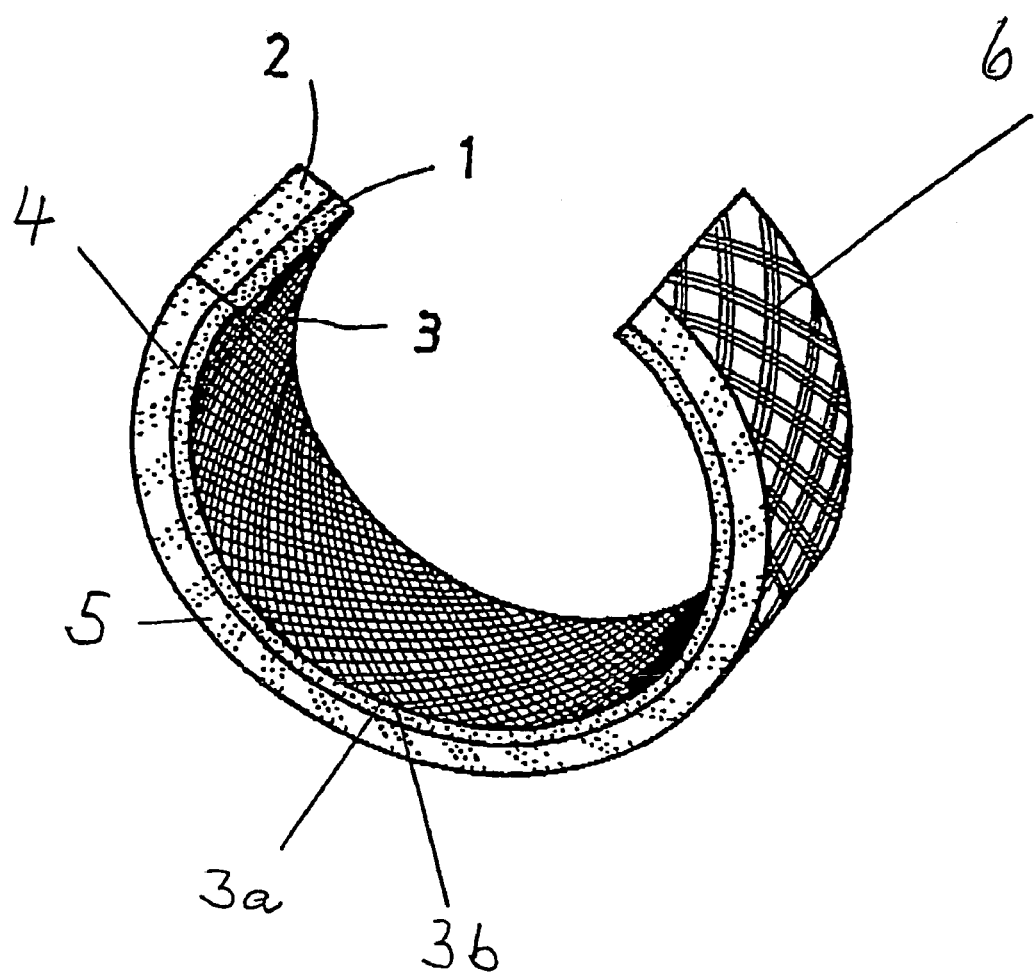

MULTILAYER PLAIN BEARING

TECHNICAL FIELD

The present invention concerns a multi-layer plane bearing.

Multi-layer plane bearings, also known as composite plane bearings, have been known for many years in various forms as machine elements for the transmission of power. As a rule, these plane bearings consist of at least two materials with differing mechanical properties, such that one material, which is generally the bearing layer, receives the power, while the other material, which is generally the gliding layer, assures the necessary gliding ability, especially under dry operation, i.e. without added liquid lubricants.

The gliding layer of the known multi-layer plane bearings usually consists of a self-lubricating material that is embedded in a suitable plastic matrix, particularly in an epoxy resin. The self-lubricating materials used are all kinds of aromatic polyamides, carbon, aromatic polysulfones, also called polyethersulfones, aromatic polyimides, aromatic polyesterimides and/or polytetrafluorethylene.

Thus, for example, DE 21 04 605 A proposes the use of filaments or threads made from the aforementioned self-lubricating materials; PCT/GB79/00046 similarly proposes the use of filaments or filament bundles made of polyacrylnitrile; DE 26 54 644 A fibers, threads, yarn or particularly fabric bands made of fluorine-containing polymers or polyacrylsulfones; U.S. Pat. No. 1,362,392 fabric and especially interwoven bands made of fluorine-containing polymers and polyaramides; U.S. Pat. No. 3,734,885 woven surface structures; CH 639,731 strands of polytetrafluorethylene threads, preferably as [illegible]; DE 42 17 319 A socks or hoses; and U.S. Pat. No. 2,503,028 general textile surface structures as self-lubricating materials, particularly when incorporated into a matrix.

RELATED ART

A multi-layer plane bearing is known from DE 88 17 149.3 U. In it, the known multi-layer plane bearing, especially the one designed as a bearing, exhibits, in addition to an outer bearing layer, an inner gliding layer, in which the inner gliding layer consists of multifilament polytetrafluorethylene fibers and multifilament polyethersulfone fibers, which are preferably constructed as knitted surface structures with a special construction. This knitted surface structure is then embedded in a resin, particularly in natural rubber and/or a mixture of natural rubber and Styrene butadine rubber, in which this rubber at the same time forms the bearing layer in the known bearing.

The known and existing multi-layer plane bearings described have the disadvantage that as a rule, mechanical reworking of the gliding layer, particularly a material-removing reworking, such as for example broaching or boring, is impossible or possible only to a very limited extent, because otherwise there is the danger that during this mechanical reworking, the gliding properties of the gliding layer will be significantly impaired.

SUMMARY OF THE INVENTION

The present invention has the object of making available a multi-layer plane bearing of the type given; that allows a subsequent reworking of the gliding layer without a drastic impairment of the gliding properties.

The multi-layer plane bearing pursuant to the invention exhibits, as does the prior art, a bearing layer and a gliding layer connected to it, in which the bearing layer provides the power reception arising from the application of the multi-layer plane bearing.

The gliding layer of the multi-layer plane bearing pursuant to the invention includes polytetrafluorethylene fibers and polyethersulfone fibers that, as in the prior art, are equipped with a resin and particularly embedded therein. In contrast to the prior art, the gliding layer of the multi-layer plane bearing pursuant to the invention includes at least one set of threads compounded with an epoxy resin, that is composed of a quantity of threads arranged according to a given pattern. Each thread of this set exhibits at least one primary thread component made from a spun polytetrafluorethylene/polyethersulfone mixed-fiber yarn and at least one secondary thread component made of spun polyethersulfone fibers, in which at least these two thread components are spun together to form the thread.

In other words, in the multi-layer plane bearing pursuant to the invention, the self-lubricating material is so formed that the gliding layer is composed not, as in the prior art, multifilament fibers or corresponding surface structures, but of a special thread construction, made up of at least two spun fiber yarns, in which this special thread construction is then provided with an epoxy resin and, particularly, is embedded in this epoxy resin.

The concept of multifilament fibers (also called filament yarn) as used in the preceding text describes such structures as are formed from a multitude of individual filaments, in which each individual filament possesses an endless length relative to its diameter.

In contrast to multifilament fibers (filament yarn), there is fiber yarn, which concept denotes threadlike structures formed of a multitude of staple fibers of a limited length, particularly between 40 m and 140 mm, through a secondary spinning.

Furthermore, multifilament fibers (filament yarns) and fiber yarns (staple fiber yarns) are all included in their common general characterizing portion and termed fibers.

Mixed fiber yarns represent such fiber yarns (staple fiber yarns) that are made from staple fibers differentiated by material, particularly such staple fibers in which the staple fiber length varies between 40 mm and 140 mm.

The multi-layer plane bearing pursuant to the invention exhibits a series of advantages. First it should be stressed that the gliding layer of the multi-layer plane bearing pursuant to the invention can be mechanically reworked without influencing its gliding properties, particularly by boring, milling, and/or polishing, without these actions negatively influencing the gliding properties. This fundamental mechanical reworking of the gliding layer of the multi-layer plane bearing pursuant to the invention allows its individual adaptation to the setting of a required tolerance for the machine parts that are positioned interact with the gliding layer, so that through subsequent reworking of the bearing layer, any desired and required running clearance may be set. With a corresponding mechanical reworking of the multi-layer plane bearing pursuant to the invention, a precision plane bearing with reproducibly-set running clearance may be produced. Based on the condition that with the known multi-layer plane bearings which cannot be mechanically reworked, in the manufacture of known bearings, individual winding mandrels made to special dimensions for the specific application of the bearing are always required, the manufacture of the known multi-layer plane bearings becomes relatively cost-intensive due to this specially-dimensioned winding mandrel, since a multitude of winding mandrels made to exacting dimensions must be prepared and kept ready. Since the multi-layer plane bearing pursuant to the invention can be mechanically reworked, especially as relates to its gliding layer, the number of winding mandrels required for its manufacture can be significantly reduced, which is correspondingly expressed in a significant reduction in manufacturing costs for the multi-layer plane bearing pursuant to the invention.

The heretofore described good mechanical machinability of the gliding layer in the multi-layer plane bearing pursuant to the invention can be traced to the fact that the thread layers provided in the epoxy resin, due to their special staple fiber construction, together with the spinning, exhibit only short-staple polytetrafluorethylene staple fibers, which may be mechanically reduced correspondingly, without these staple fibers being torn out of adjacent areas of the gliding layer through the mechanical reworking, as is the case with known multifilament fibers, due to the unlimited length.

Furthermore, the gliding layer pursuant to the invention exhibits excellent gliding properties, particularly without additional liquid lubrication. These excellent gliding properties are expressed particularly in long durability, in which the lubrication effected by the gliding layer of the multi-layer plane bearing pursuant to the invention always remains constant, even with increasing wear of the gliding layer, which is also to be traced to the above-described special construction of the thread layers. Furthermore, the specially constructed thread layer in the gliding layer of the multi-layer plane bearing pursuant to the invention permit the epoxy resin to be evenly distributed in the spaces between the threads throughout the thickness of the thread, so that in principle a high embedding of each individual staple fiber of the mixed-fiber yarn is assured.

Basically, there are two possibilities for forming the thread layer intended for the gliding layer in the multi-layer plane bearing pursuant to the invention. In the first possibility, the thread layer is made up of several individual threads that if desired can also exhibit a different construction or a different denier. It is, however, especially advantageous, particularly from the viewpoint of manufacturing the multi-layer plane bearing pursuant to the invention, if the thread layer is formed from one single thread, provided in the gliding layer according to the sample given, for in the simplest case, for example in the manufacture of cylindrical bearings, this single thread is continually wound onto the corresponding winding mandrel.

A particularly suitable form of the multi-layer plane bearing pursuant to the invention provides that the thread is a double thread, i.e. consisting of a single spun polytetrafluorethylene/polyethersulfone mixed fiber yarn component and a single second thread component. Such a double thread is much more easily manufactured than a triple thread or a quadruple thread, which in the end is expressed in the manufacturing costs for the multi-layer plane bearing pursuant to the invention.

With respect to the second thread component, it must be fundamentally stressed that this second thread component is, alternatively, either a polyethersulfone filament yarn or particularly a polyethersulfone fiber yarn, in which especially when using a polyethersulfone fiber yarn as the second thread component of the thread produced here, particularly the double thread here produced exhibits only staple fibers. Correspondingly, because of the presence exclusively of staple fibers in the gliding layer, the gliding layer of such a multi-layer plane bearing pursuant to the invention lends itself especially well to subsequent mechanical reworking and without the appearance of undesirable damage to the gliding layer, so that this embodiment of the multi-layer plane bearing pursuant to the invention is particularly suitable.

Furthermore, the multi-layer plane bearing pursuant to the invention, due to the special thread construction, exhibits the additional decisive advantage that here the weight ratio of polytetrafluorethylene to polysulfone in the thread can be adjusted to the respective requirements that are set for the gliding layer, particularly with respect to its durability and gliding properties, since it is necessary for this only to vary this weight proportion by varying the corresponding staple fiber proportion in the manufacture of the thread. Particularly good gliding properties are exhibited by the gliding layers of the multi-layer plane bearing pursuant to the invention in which the weight ratio of polytetrafluorethylene to polyethersulfone in the thread varies between 1:1.8 and 1:2.2.

A particularly suitable extension of the multi-layer plane bearing pursuant to the invention provides that in the primary thread component the weight ratio of polytetrafluorethylene to polyethersulfone is varied between 0.9:1.1 and 1.1:0.9, in which particularly such forms of this embodiment of the multi-layer plane bearing pursuant to the invention are especially good for mechanical reworking, in which the polytetrafluorethylene to polyethersulfone in the primary thread component is present in a weight ratio of 1:1.

Just as by the above-described variation of the weight ratios of the individual staple fibers, the gliding properties and workability of the gliding layer of the multi-layer plane bearing pursuant to the invention may be varied by the level of yarn rotation of the first thread component and/or the level of yarn rotation of the second thread component.

It should be fundamentally stressed here, that the level of yarn rotation influences on one hand the strength of the binding of the staple fibers in the yarn bond and on the other hand the receiving capacity of the primary thread component or the secondary thread component for the epoxy resin, in which preferred yarn rotation values of the primary thread component and/or the secondary thread component vary between 300 rotations/m and 800 rotations/m, particularly between 400 rotations/m and 700 rotations/m. Alternatively the yarn rotation can here be carried out in such a way that it is in the form of an S-rotation or a Z-rotation.

A further variation of the properties, particularly of the gliding properties and the mechanical workability of the gliding layer of the multi-layer plane bearing pursuant to the invention is brought about when the thread that forms the thread layer in the gliding layer of the multi-layer plane bearing pursuant to the invention exhibits a varying thread rotation, in which particularly advantageous thread rotations vary between 80 rotations/m and 400 rotations/m, particularly between 120 rotations/m and 250 rotations/m.

Basically the total denier of the thread provided in the gliding layer of the multi-layer plane bearing pursuant to the invention is dependent on how thick the gliding layer is to be made, how far the thickness of the gliding layer is to be reduced through mechanical reworking, and which gliding properties the gliding layer must offer over which stress duration. Preferably, the thread will have a total denier of between 200 dtex and 1,200 dtex, in which this thread will then be formed out of a primary and a secondary thread component by spinning, of which the denier varies between 100 dtex and 600 dtex respectively.

Also, varying the individual fiber denier of the staple fibers forming the primary and secondary thread components effects a variation in the gliding properties and the mechanical workability of the gliding layer of the multi-layer plane bearing pursuant to the invention. Particularly, the multi-layer plane bearing pursuant to the invention exhibits a gliding layer in which the thread layer is formed of threads whose primary and/or secondary thread components possess staple fibers with an individual staple fiber denier of between 0.8 dtex and 4 dtex respectively.

As already described at the start, in the multi-layer plane bearing, the thread layer treated with epoxy resin exhibits a multitude of threads arranged according to a sample, in which this multitude of threads is preferably formed from a single individual thread. Particularly if the thread layer exhibits a multitude of threads arranged in one direction parallel to each other and a multitude of threads running in a second direction running in a second direction parallel to each other, in which the first direction is at a 90° angle to the second direction, a gliding layer constructed in this manner possesses a particularly durable and uniform gliding property, so that this form of the multi-layer plane bearing pursuant to the invention is distinguished by a particularly long usable time.

Similarly, a high degree of carrying capacity and a long service life for the gliding layer of the multi-layer plane bearing pursuant to the invention are offered if the thread or threads of the thread layer are not only surface-coated with the epoxy resin and/or the spaces between the threads filled with the epoxy resin, but rather in addition to this, the threads of the thread layer are completely embedded in the epoxy resin.

If special requirements, especially with respect to durability, are set for the gliding layer of the multi-layer plane bearing pursuant to the invention, a particularly advantageous extension of the multi-layer plane bearing pursuant to the invention provides that the epoxy resin with which the thread of threads is/are equipped be treated with at least one wear-reducing addition.

In particular, the epoxy resin may have a wear-reducing addition metal sulfides, preferably molybdenum sulfide and/or tungsten sulfide, graphite, boron nitride, preferably hexagonal boron nitride, iron-III-oxide, barium sulfate and/or polytetrafluorethylenes, especially a powder of polytetrafluorethylene.

Particularly good results with respect to the above-described increase in the wear-resistance of the gliding layer of the multi-layer plane bearing pursuant to the invention are attained if the particle size of the wear-reducing addition is adjusted to the total denier of the thread, such that particularly such wear-reducing additions are used that have a particle size between 8 μm and 30 μm.

With respect to the concentration of the minimum of one wear-reducing addition to the epoxy resin, as described in detail before, it is generally to be emphasized that this concentration depends upon which wear properties, particularly with a given thread construction, are required of the gliding layer of the multi-layer plane bearing pursuant to the invention. Particularly good wear characteristics in connection with outstanding gliding properties are attained if the epoxy resin exhibits the minimum of one wear-reducing addition in a concentration of 2 weight-% to 20 weight-% compared to the weight of the epoxy resin. Here the wear-resistance of the gliding layer of such an embodiment of the multi-layer plane bearing pursuant to the invention is improved by some 20% to 30% in comparison to an identical embodiment of the multi-layer plane bearing pursuant to the invention whose gliding layer contains no wear-reducing addition; in which this improvement, however, can also be attained by varying the weight proportion of polytetrafluorethylene and polyethersulfone staple fibers, by varying the individual denier of the minimum of two components, by varying the total denier of the thread and/or by varying the yarn- or thread-rotation to adjust to the required wear-resistance in each case.

In order to attain for the multi-layer plane bearing pursuant to the invention a particularly secure and trouble-free connection of the bearing layer with the gliding layer, the bearing layer will preferably include an additional epoxy resin that is strengthened by at least one corresponding glass fiber layer. Particularly if the additional epoxy resin provided in the bearing layer is identical to the epoxy resin found in the gliding layer, the result, after curing of the epoxy resin, which should take place between 80° C. and 220° C., such an embodiment of the multi-layer plane bearing pursuant to the invention, is that the bearing layer cannot be separated from the gliding layer without destroying the gliding layer.

As repeatedly explained in detail above, the multi-layer plane bearing pursuant to the invention is most advantageously formed as a cylindrical sleeve with an enclosed gliding layer or as a plate-like gliding layer.

Advantageous extensions of the multi-layer plane bearing pursuant to the invention are given in the subordinate claims.

THE DRAWING

The multi-layer plane bearing pursuant to the invention will be further explained below using one embodiment in connection with the drawing.

DETAILED DESCRIPTION

In the single FIGURE, a multi-layer plane bearing formed as a round sleeve is schematically and perspectively illustrated, in which the relative illustration of the round sleeve is only partial, in order to also show a sectional surface. Here the illustrated round sleeve exhibits an enclosed gliding layer 1 and a one-piece outer bearing layer 2 connected to it.

The gliding layer 1 includes an epoxy resin matrix 4 as well as a schematically drawn thread layer 3 encased in the epoxy resin layer 4. Here the thread layer 3 is formed from a multitude of individual threads, in which the threads 3a run in one direction, while the threads 3b are aligned in a second direction in such a way that the threads 3a form an angle of 90° relative to the threads 3b.

The threads 3a and 3b exhibit an identical thread construction.

Here each thread 3a or 3b possesses a primary thread component, consisting of a spun polytetrafluorethylene-/polyethersulfone mixed fiber with a Z-rotation of 600 rotations/m and a total denier of 200 dtex, while the second thread component represents a polyethersulfone fiber yarn, having a Z-rotation likewise of 600 rotations/m. The secondary thread component has a total denier of 200 dtex. Naturally, other primary or secondary thread components may also be used, whose denier should then preferably vary between 200 dtex and 600 dtex.

These two thread components are twisted together by shaping thread 3a or 3b in an S-direction with a rotation of 140 rotations/m. For the sake of clarity, it should be noted that threads 3a and 3b are not connected to each other at their cross-points by a textile-technical bond. Rather, threads 3a and 3b of the thread layer 3 are embedded in the epoxy resin matrix 4 in such a way that they are entirely enclosed by the epoxy resin matrix., such that the spaces between the threads 3a or 3b are also filled with epoxy resin.

The gliding layer 1 is surrounded by a bearing layer 2 and is intimately connected to it. This intimate connection is attained by forming bearing layer 2 out of an additional epoxy resin matrix 5, such that the epoxies of the epoxy resin matrix 4 and the epoxy resin matrix 5 are chemically identical. In the additional epoxy resin matrix 5 of bearing layer 2 are encased glass fibers 6, which vastly improve the bearing capacity of the bearing layer 2.

In order to manufacture the round sleeve shown in the FIGURE, the threads 3a and 3b, which form the thread layer 3 of the gliding layer 1, are coated with a surplus of the epoxy resin and then in the cross sample wound onto a dome, not shown. After drying and condensation at a temperature between 80° C. and 220° C the result is a stable inner gliding layer 1.

Onto this cured gliding layer 1, the glass fibers 6 which have been thoroughly coated with the identical epoxy resin are wound, until the desired roller thickness of the bearing layer 2 is reached. This is followed by drying and, if needed, curing of the epoxy resin.

Should it be desired and necessary, particularly hardeners, accelerants and pigments may be added to the epoxy resin, in that the epoxy resin that is used for the manufacture of gliding layer 1 may also have the previously described wear-reducing additions added to it.

Providing that the epoxy resin of gliding layer 1 and of the bearing layer 2 is identical, the result is an excellent binding and fastness between the two layers. If this bond is to be further improved, the epoxy resin of the gliding layer is only dried and not cured. The bearing layer is then built up on the dried epoxy resin as previously described. This is followed by a joint curing of the epoxy resin of the gliding layer and of the bearing layer.

After the unfinished round sleeve is made, it is taken off the dome needed for winding, so that the inner gliding layer 1 can be precisely dimensioned to the respective requirements by means of a mechanical material-removing reworking.

The invention claimed is:

1. Multi-layer plane bearing with a bearing layer and a gliding layer connected to it, in which the gliding layer contains polytetrafluorethylene fibers and polyethersulfone fibers, which are provided with a resin, characterized by the fact that the gliding layer contains at least one thread layer treated with an epoxy resin, consisting of a multitude of threads of at least one thread type arranged according to a given pattern, in which each thread exhibits at least one primary thread component made of spun polytetrafluorethylene/polyethersulfone mixed fiber yarn and at least one secondary component made of a spun polyethersulfone fiber, and that the minimum of two thread components are twisted in shaping the threads.

2. Multi-layer plane bearing as claimed in claim 1, characterized by the fact that the thread layer is formed from a single thread type, arranged according to the given sample pattern.

3. Multi-layer plane bearing as claimed in claim 1, characterized by the fact that the thread type is a double thread.

4. Multi-layer plane bearing as claimed in claim 1, characterized by the fact that the secondary thread component is a polyethersulfone fiber yarn.

5. Multi-layer plane bearing as claimed in claim 1, characterized by the fact that the weight ratio of polytetrafluorethylene to polyethersulfone in the thread varies between 1:1.8 and 1:2.2.

6. Multi-layer plane bearing as claimed in claim 1, characterized by the fact that the weight ratio of polytetrafluorethylene to polyethersulfone in the primary thread component varies between 0.9:1.1 and 1.1:0.9.

7. Multi-layer plane bearing as claimed in claim 1, characterized by the fact that the primary thread component exhibits a yarn rotation between 300 rotations/m and 800 rotations/m.

8. Multi-layer plane bearing as claimed in claim 1, characterized by the fact that the secondary thread component exhibits a yarn rotation between 300 rotations/m and 800 rotations/m.

9. Multi-layer plane bearing as claimed in claim 1, characterized by the fact that the thread type exhibits a yarn rotation between 80 rotations/m and 400 rotations/m.

10. Multi-layer plane bearing as claimed in claim 1, characterized by the fact that the primary and/or secondary thread component has a total denier between 100 dtex and 600 dtex.

11. Multi-layer plane bearing as claimed in claim 1, characterized by the fact that the primary and/or secondary thread component has an individual fiber denier between 0.8 dtex and 4 dtex.

12. Multi-layer plane bearing as claimed in claim 1, characterized by the fact that the thread layer exhibits a multitude of threads running in the first direction, arranged parallel to one another, and a multitude of threads running in a second direction, also arranged parallel to one another, in which the first direction forms a 90° angle relative to the second direction.

13. Multi-layer plane bearing as claimed in claim 1, characterized by the fact that the threads in the thread layer are embedded in the epoxy resin.

14. Multi-layer plane bearing as claimed in claim 1, characterized by the fact that the epoxy resin is treated with at least one abrasion-reducing addition.

15. Multi-layer plane bearing as claimed in claim 14, characterized by the fact that the wear-reducing addition in the epoxy resin includes metal sulfides, including at least one of molybdenum sulfide and/or tungsten sulfide, graphite, boron nitride, preferably hexagonal boron nitride, iron-III-oxide, barium sulfate and/or polytetra-fluorethylenes.

16. Multi-layer plane bearing as claimed in claim 14, characterized by the fact that minimum of one wear-reducing addition exhibits a particle size between 8 μm and 30 μm.

17. Multi-layer plane bearing as claimed in claim 14, characterized by the fact that the minimum of one wear-reducing addition is contained in the epoxy resin in a concentration of 2 weight-% to 20 weight-% relative to the weight of the epoxy resin.

18. Multi-layer plane bearing as claimed in claim 1, characterized by the fact that the bearing layer includes at least one additional epoxy resin and glass fibers.

19. Multi-layer plane bearing as claimed in claim 18, characterized by the fact that the additional epoxy resin of the bearing layer is identical with the epoxy resin of the gliding layer.

20. Multi-layer plane bearing as claimed in claim 1, characterized by the fact that the plane bearing is formed as a cylindrical sleeve with an enclosed gliding layer or as a plate-like bearing.

21. Multi-layer plane bearing as claimed in claim 1, characterized by the fact that the primary thread component exhibits a yarn rotation between 400 rotations/m and 700 rotations/m.

22. Multi-layer plane bearing as claimed in claim 1, characterized by the fact that the secondary thread component exhibits a yarn rotation between 400 rotations/m and 700 rotations/m.

23. Multi-layer plane bearing as claimed in claim 1, characterized by the fact that the thread exhibits a yarn rotation between 120 rotations/m and 250 rotations/m.

* * * * *

UNITED STATES PATENT AND TRADEMARK OFFICE
CERTIFICATE OF CORRECTION

| | | |
|---|---|---|
| PATENT NO. | : 7,226,213 B2 | Page 1 of 1 |
| APPLICATION NO. | : 10/497937 | |
| DATED | : June 5, 2007 | |
| INVENTOR(S) | : Roos et al. | |

It is certified that error appears in the above-identified patent and that said Letters Patent is hereby corrected as shown below:

Column 7, lines 56, 57: "the given sample pattern" should read --the given pattern--.

Signed and Sealed this

Twenty-seventh Day of November, 2007

JON W. DUDAS
*Director of the United States Patent and Trademark Office*